US011892793B2

(12) United States Patent
Haruta

(10) Patent No.: US 11,892,793 B2
(45) Date of Patent: Feb. 6, 2024

(54) IMAGE FORMING APPARATUS

(71) Applicant: BROTHER KOGYO KABUSHIKI KAISHA, Nagoya (JP)

(72) Inventor: Kotaro Haruta, Yokkaichi (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 242 days.

(21) Appl. No.: 17/536,935

(22) Filed: Nov. 29, 2021

(65) Prior Publication Data

US 2022/0171319 A1 Jun. 2, 2022

(30) Foreign Application Priority Data

Nov. 30, 2020 (JP) ................................ 2020-199015

(51) Int. Cl.
*G03G 15/00* (2006.01)
*B41J 29/13* (2006.01)

(52) U.S. Cl.
CPC .......... *G03G 15/6552* (2013.01); *B41J 29/13* (2013.01); *G03G 15/5016* (2013.01)

(58) Field of Classification Search
CPC .. G03G 15/6552; G03G 15/5016; B41J 29/13
See application file for complete search history.

(56) References Cited

U.S. PATENT DOCUMENTS 7,995,948 B2 * 8/2011 Yano .................. G03G 21/1633 399/81
8,204,401 B2 * 6/2012 Tsuchiya ............ G03G 21/1633 399/107
2007/0147923 A1 * 6/2007 Uehara ............. G03G 15/6576 399/406
2008/0014007 A1 * 1/2008 Ukai .................... G03G 21/206 400/691
2013/0286433 A1 10/2013 Matsushima et al.
2015/0153700 A1 * 6/2015 Fujikawa ........... G03G 21/1619 399/405

FOREIGN PATENT DOCUMENTS

JP 2013-228540 A 11/2013

* cited by examiner

*Primary Examiner* — David H Banh
(74) *Attorney, Agent, or Firm* — Merchant & Gould P.C.

(57) ABSTRACT

A first cover includes a first discharge tray portion and a first recess. The first discharge tray portion supports a discharged sheet. The first recess is formed at the first discharge tray portion. The first recess extends along a sheet discharge direction to a downstream end of the first discharge tray portion in the sheet discharge direction. The second cover surrounds the first cover. A second cover includes a second discharge tray portion and a second recess. The second discharge tray portion is arranged downstream of the first discharge tray portion in the sheet discharge direction. The second discharge tray portion supports the discharged sheet in cooperation with the first discharge tray portion. The second recess is arranged downstream of the first recess in the discharge direction. The second recess is formed continuously from the first recess, and serves as a sheet handle portion in cooperation with the first recess.

15 Claims, 5 Drawing Sheets

IMAGE FORMING APPARATUS

CROSS REFERENCE TO RELATED APPLICATIONS

This application claims priority from Japanese Patent Application No. 2020-199015 filed Nov. 30, 2020. The entire content of the priority application is incorporated herein by reference.

BACKGROUND

Conventionally, an image forming apparatus is known in which a concave sheet handle portion is provided to facilitate the removal of a discharged sheet. For example, a sheet handle portion is arranged at the front of a discharge tray that supports the discharged sheet.

SUMMARY

According to one aspect, this specification discloses an image forming apparatus. The image forming apparatus includes a housing having an opening, and a top cover covering the opening. The top cover includes a first cover and a second cover. The first cover includes a first discharge tray portion and a first recess. The first discharge tray portion configured to support a discharged sheet. The first recess is formed at the first discharge tray portion. The first recess extends along a sheet discharge direction to a downstream end of the first discharge tray portion in the sheet discharge direction. The second cover surrounds the first cover. The second cover includes a second discharge tray portion and a second recess. The second discharge tray portion is arranged downstream of the first discharge tray portion in the sheet discharge direction. The second discharge tray portion is configured to support the discharged sheet in cooperation with the first discharge tray portion. The second recess is arranged downstream of the first recess in the sheet discharge direction. The second recess is formed continuously from the first recess. The second recess serves as a sheet handle portion in cooperation with the first recess.

According to the above configuration, by extending the sheet handle portion from a first cover to a second cover, the length of the top cover in the sheet discharge direction is shortened as compared with the case where the sheet handle portion is provided only at the first cover. Thus, the image forming apparatus is made compact.

BRIEF DESCRIPTION OF THE DRAWINGS

Embodiments in accordance with this disclosure will be described in detail with reference to the following figures wherein.

DETAILED DESCRIPTION

In the above configuration, a space for arranging the sheet handle is required at the front of the discharge tray. If it is attempted to shorten the length of the image forming apparatus in the sheet discharge direction, the sheet handle cannot be arranged. Thus, it is difficult to make the image forming apparatus compact.

In view of the foregoing, an aspect of an objective of this disclosure is to provide, in an image forming apparatus provided with a top cover including a first cover and a second cover surrounding the first cover, a configuration in which a sheet handle is provided at the top cover and the length of the top cover in a sheet discharge direction is shortened.

Figure 1:
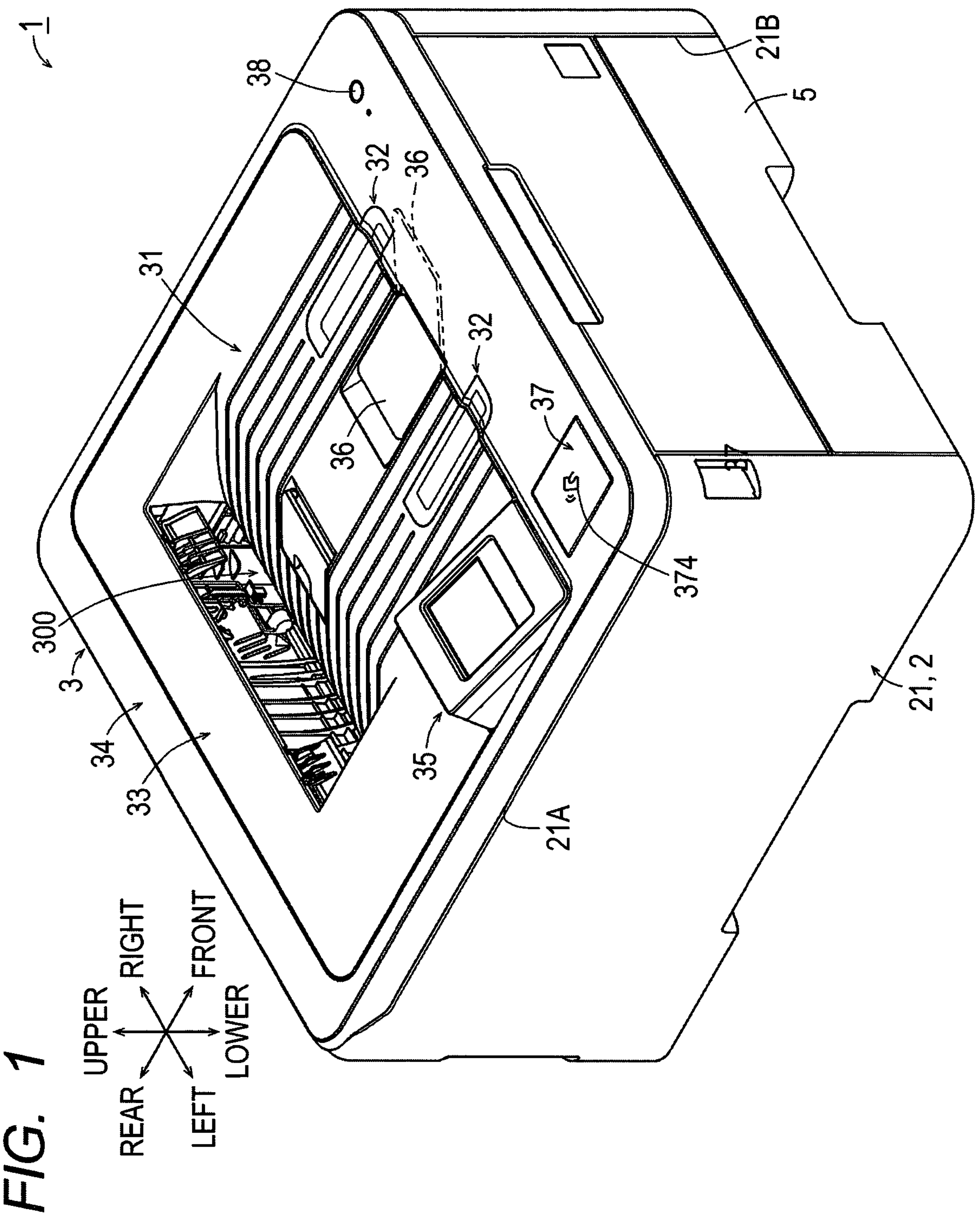
FIG. 1 is a perspective view of an image forming apparatus.

In the following description, based on a state in which an image forming apparatus 1 is installed so as to be usable as shown in FIG. 1, the sheet discharge direction in a discharge tray 31 is defined as frontward, and the opposite direction is defined as rearward. The left-right direction is defined when the image forming apparatus 1 is viewed from the front side. The side of a top cover 3 of the image forming apparatus 1 is defined as the upper side, and the side of a housing 2 is defined as the lower side. In the present embodiment, the front end of each member on the upper surface of the top cover 3 is the downstream end in the sheet discharge direction. The left-right direction is an example of a perpendicular direction perpendicular to the sheet discharge direction when viewed from above.

[Overall Configuration of the Image Forming Apparatus]

The image forming apparatus 1 includes the housing 2 and the top cover 3. The housing 2 includes a frame (not shown) that supports each member, and a cover 21 that covers the frame and forms the appearance. The cover 21 has a first opening 21A at the entire upper surface and a second opening 21B at the lower part of the front surface.

The housing 2 accommodates a sheet tray 5 that supports a sheet before image formation, a conveyance mechanism that conveys the sheet from the sheet tray 5, an image forming unit that forms an image on the sheet conveyed by the conveyance mechanism, and a discharge mechanism that conveys the sheet from the image forming unit to the outside of the housing 2.

The sheet tray 5 is configured to be inserted and removed from the housing 2 by moving in the front-rear direction through the second opening 21B. The configuration of the image forming unit is not particularly limited, and configurations such as an electrophotographic method, an inkjet method, and a thermal head method may be used. In the present embodiment, the image forming unit is a so-called direct tandem system for color printing, and includes four drum units arranged in the front-rear direction, exposure LED heads 30 (see FIG. 4), and a fixing unit.

The top cover 3 is a member constituting the upper part of the image forming apparatus 1. The top cover 3 is swingably attached to the rear upper part of the housing 2 by a hinge 39 (see FIG. 4), and is movable between a closed position for covering the first opening 21A (the position shown in FIG. 1) and an open position for opening the first opening 21A. Alternatively, the top cover 3 may be fixed to the housing 2 so as not to open and close.

The top cover 3 has a discharging opening 300 for discharging the sheet from the housing 2 to outside. The top cover 3 includes, on the upper surface thereof, the discharge tray 31 that supports the sheet discharged by the discharge mechanism through the discharging opening 300. The discharge tray 31 has a shape that is inclined and convexly curved from the rear side to the front side at the upper surface of the top cover 3. With this shape, the sheet on which the image is formed is discharged to the discharge tray 31 through the discharging opening 300 from the rear side toward the front side by the discharge mechanism.

Further, the top cover 3 includes two sheet handle portions 32 for easily putting a hand under the sheet discharged to the discharge tray 31 and taking out the sheet. The sheet handle portions 32 are arranged at both sides of a sheet stopper (regulating portion) 36 described later in the left-right direction. This makes it easy to take out the discharged sheet from either the left side or the right side. The top cover 3 will be described in greater detail below.

[Top Cover]

The top cover 3 includes a first cover 33 and a second cover 34. The first cover 33 has a substantially rectangular shape when viewed from above. The second cover 34 surrounds the front, rear, left, and right of the first cover 33. The first cover 33 and the second cover 34 are arranged such that the flat surface portions of the upper surface are flush with each other. By forming the first cover 33 and the second cover 34 with members of different colors, the design is improved.

<First Cover>

Figure 2:
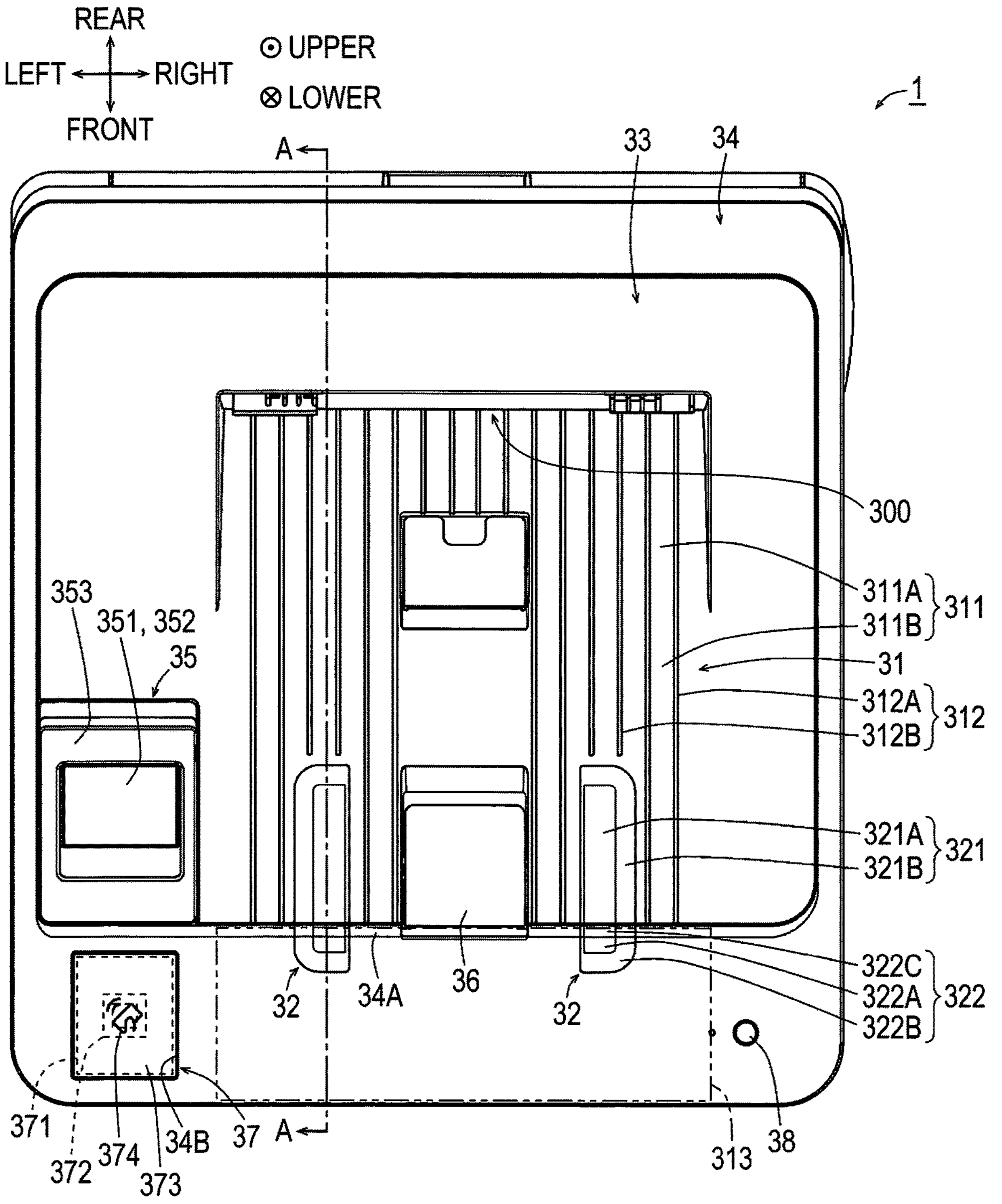
FIG. 2 is a plan view of the image forming apparatus shown in FIG. 1.
Figure 3:
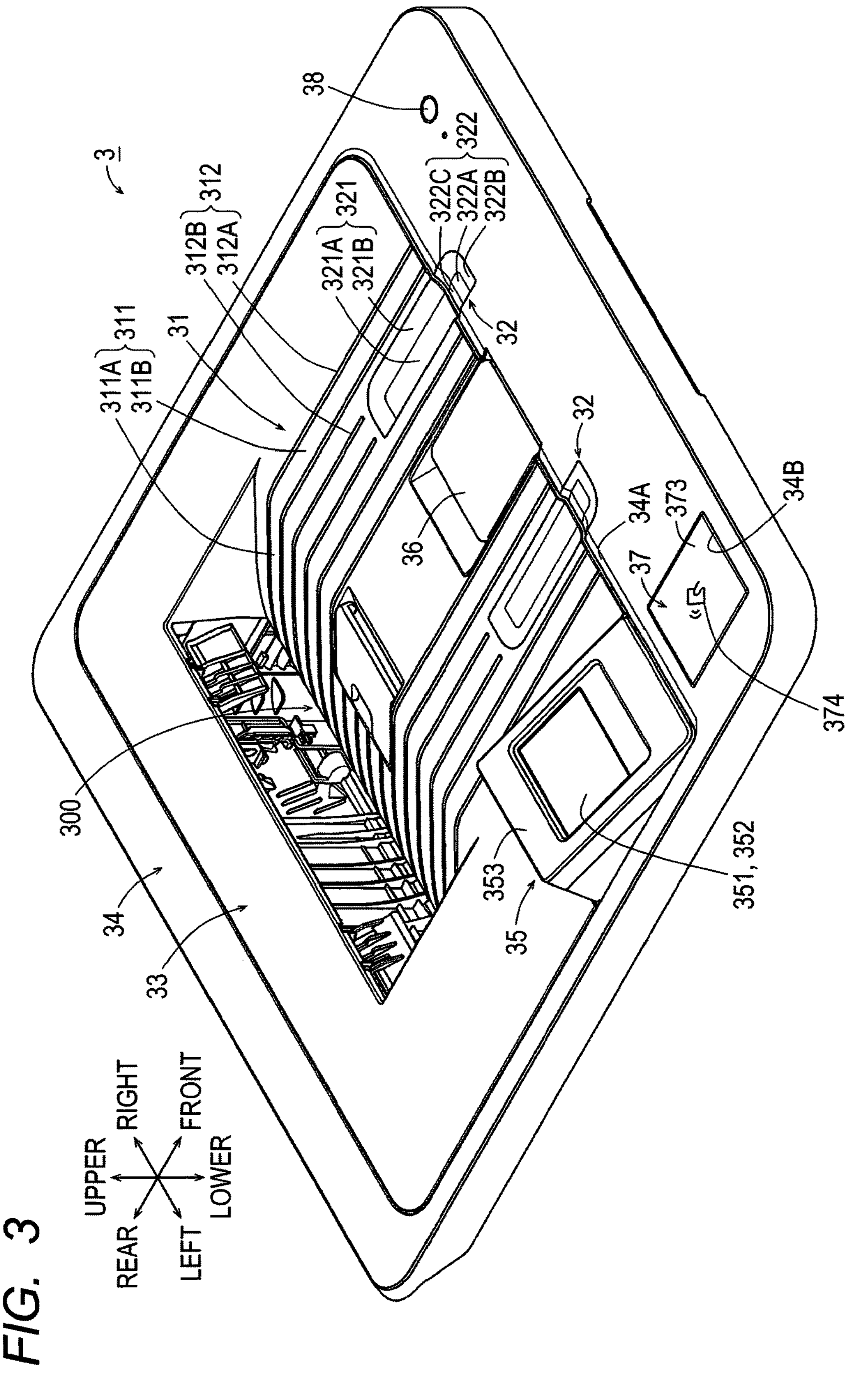
FIG. 3 is an enlarged perspective view of a top cover.
Figure 4:
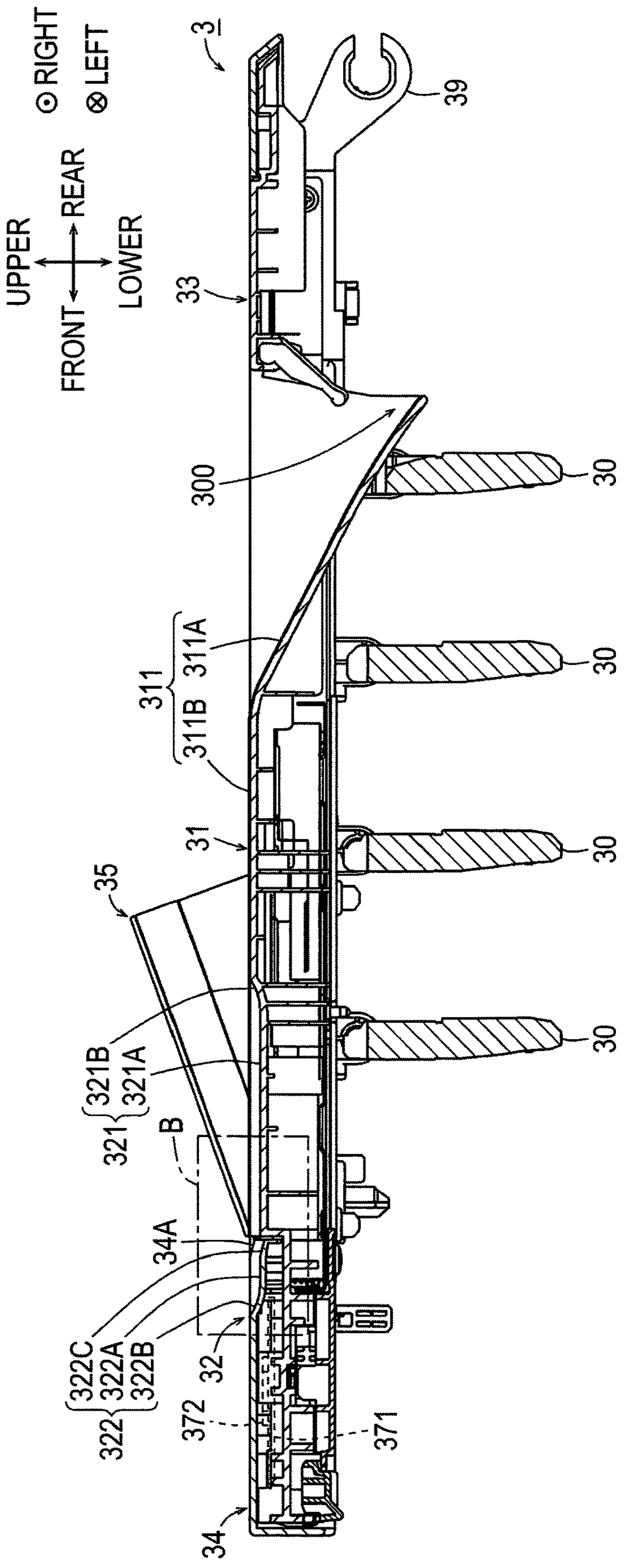
FIG. 4 is a cross-sectional view taken along a line A-A in FIG. 2.

As shown in FIGS. 2 to 4, the first cover 33 includes a first discharge tray portion 311 which is a part of the discharge tray 31, an operation panel 35, the sheet stopper 36, and a first recess 321 which is a part of the sheet handle portion 32.

<First Discharge Tray Portion>

The first discharge tray portion 311 is a part of the discharge tray 31 formed on the first cover 33. The first discharge tray portion 311 includes an inclined surface 311A extending from the rear side toward the front side on the upper surface of the first cover 33, and a horizontal surface 311B that is continuous with the inclined surface 311A. The first discharge tray portion 311 extends from the discharging opening 300 in the sheet discharge direction (the rear-to-front direction). The first discharge tray portion 311 is formed up to the front end of the first cover 33.

The first discharge tray portion 311 has a plurality of ribs 312 protruding from the upper surfaces of the inclined surface 311A and the horizontal surface 311B and extending along the sheet discharge direction. The ribs 312 include a plurality of ribs 312A extending to the front end of the first discharge tray portion 311 and a plurality of ribs 312B extending to the vicinity of the rear end of the first recess 321. The ribs 312 reduce the conveyance resistance of a discharged sheet and the sheet is smoothly discharged.

<Operation Panel>

The operation panel 35 is arranged at the left front end of the first cover 33 and to the left of the first discharge tray portion 311. The operation panel 35 includes a display 351, an operation interface 352, and a cover 353. The display 351 is a display device such as a liquid crystal panel. The operation interface 352 is an operation device such as a touch panel and operation buttons. The cover 353 has an opening that exposes the display 351 and the operation interface 352, and is formed to be substantially rectangular when viewed from above and substantially triangular when viewed from the side. The arrangement of the operation panel 35 is not particularly limited, and may be arranged at the right front end of the first cover 33, for example.

<Sheet Stopper>

The sheet stopper 36 is a substantially rectangular plate-shaped member that contacts the downstream end of the sheet discharged to the discharge tray 31 in the sheet discharge direction. The sheet stopper 36 is arranged at the center of the first discharge tray portion 311 in the left-right direction and in a recessed portion at the front end of the first discharge tray portion 311. The sheet stopper 36 is rotatably supported at the front end of the first discharge tray portion 311.

The sheet stopper 36 is swingable between a stowed position at which the sheet stopper 36 horizontally extends along the upper surface of the first cover 33 (the position shown by the solid line in FIG. 1) and a use position at which the tip of the sheet stopper 36 stands diagonally forward (shown by the double-dot chain line in FIG. 1). When the sheet stopper 36 is located at the use position, the leading end of the sheet discharged to the discharge tray 31 contacts the sheet stopper 36, and the sheet is stopped on the discharge tray 31.

<First Recess>

The first recess 321 is a portion of the sheet handle portion 32 formed on the first cover 33. The first recess 321 is located below the sheet supported by the first discharge tray portion 311 and extends to the front end of the first discharge tray portion 311 along the sheet discharge direction.

The two first recesses 321 have a symmetrical shape in the left-right direction. In the present embodiment, the first recess 321 includes a flat bottom surface 321A extending in the horizontal direction and an inclined surface 321B extending diagonally upward from the periphery other than the front end of the bottom surface 321A. The shape of the first recess 321 is not particularly limited, and may be, for example, a substantially rectangular parallelepiped shape.

In the present embodiment, at least part of the first recess 321 overlaps the operation panel 35 in the left-right direction when viewed from above. In the present embodiment, as shown in FIG. 2, the entire first recess 321 and the operation panel 35 overlap each other in the left-right direction when viewed from above. With this configuration, the operation panel 35 is arranged near the front end of the first cover 33, and hence the user can easily see and operate the operation panel 35 from the front side (the downstream side in the sheet discharge direction) of the image forming apparatus 1.

As shown in FIG. 2, the length of the first recess 321 in the sheet discharge direction is longer than the length of the sheet stopper 36 in the sheet discharge direction. As shown in FIG. 2, the first recess 321 overlaps the ribs 312A in the left-right direction when viewed from above. As shown in FIG. 2, the first recess 321 is arranged between one of the ribs 312A and another one of the ribs 312A in the left-right direction when viewed from above.

<Second Cover>

As shown in FIGS. 2 to 4, the second cover 34 includes a second discharge tray portion 313 which is a part of the discharge tray 31, a near-field wireless communication unit 37, a power button 38, and a second recess 322 which is a part of the sheet handle portion 32.

<Second Discharge Tray Portion>

The second discharge tray portion 313 is a portion of the discharge tray 31 formed on the second cover 34. The second discharge tray portion 313 is continuously arranged at the front end of the first discharge tray portion 311.

Figure 5:
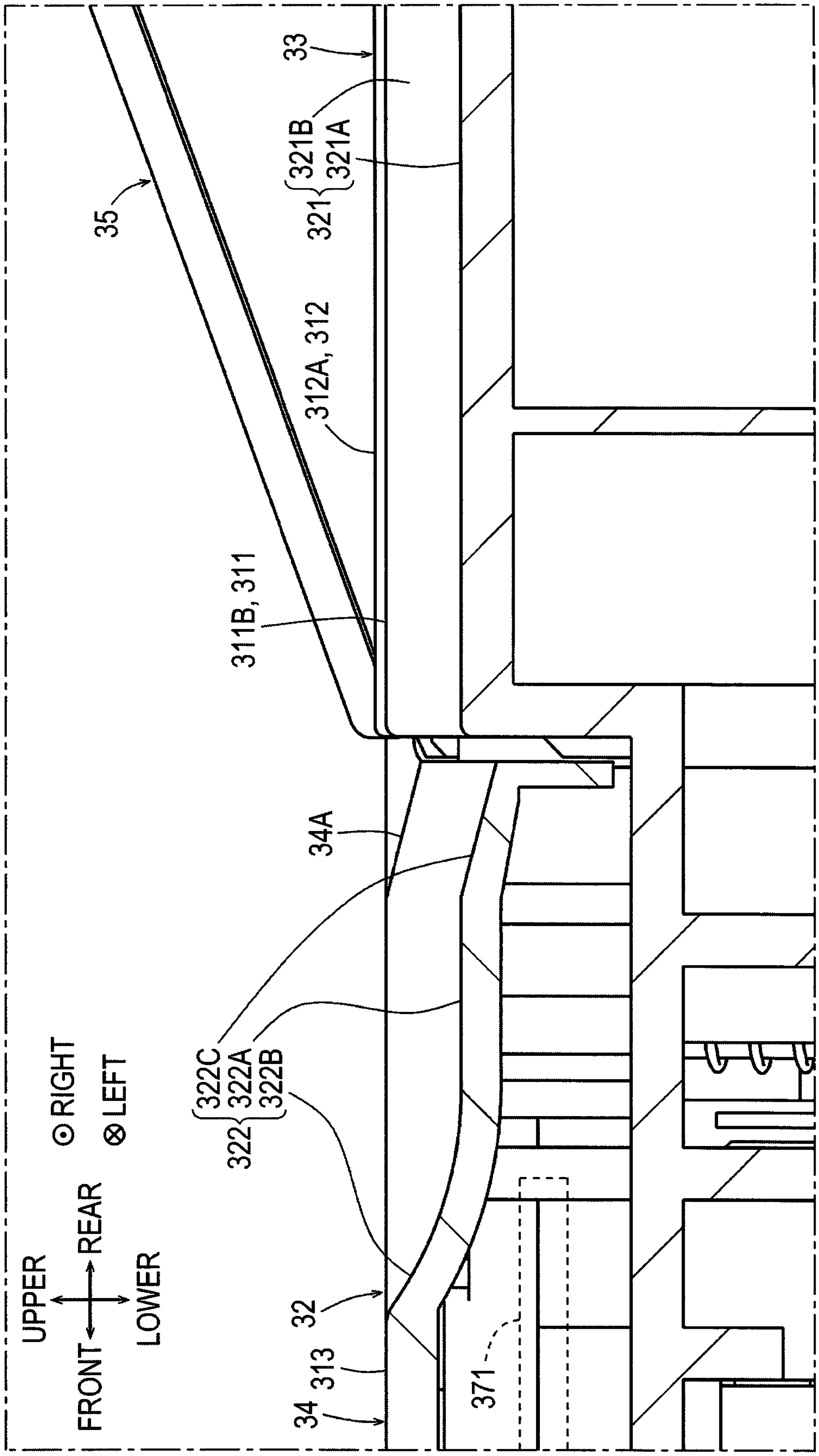
FIG. 5 is an enlarged view of a part B in FIG. 4.

As shown in FIG. 5, the boundary portion of the second cover 34 with the front end of the first cover 33 is an inclined surface 34A that is inclined downward toward the rear. With this configuration, the front end of the first discharge tray portion 311 is located above the rear end of the second discharge tray portion 313.

In this way, at the boundary between the front end of the first discharge tray portion 311 and the rear end of the second discharge tray portion 313, the first discharge tray portion 311 is located at a higher position than the second discharge tray portion 313, and the ribs 312A are formed on the first discharge tray portion 313. Thus, the leading end of the discharged sheet is smoothly guided from the first discharge tray portion 311 to the second discharge tray portion 313 without being caught.

<Near-Field Wireless Communication Unit>

As shown in FIGS. 2 and 4, the near-field wireless communication unit 37 is arranged at the left front portion of the second cover 34. The near-field wireless communication unit 37 may be arranged at a portion of the second cover 34 other than the second discharge tray portion 313, and may be arranged, for example, at the right front portion of the second cover 34.

The near-field wireless communication unit 37 is a device for performing near-field wireless communication with an external device such as an IC card or a smartphone. In this embodiment, the near-field wireless communication unit 37 uses NFC (Near Field Communication). The near-field wireless communication unit 37 includes a board 371, an antenna 372, a third cover 373 that covers the board 371 and the antenna 372, and a mark 374.

The board 371 is a substantially rectangular plate-shaped circuit board. The antenna 372, a communication circuit, a detection circuit, and so on are mounted on the board 371. The communication circuit has a function of performing signal processing of radio waves transmitted and received. The detection circuit has a function of detecting the intensity of radio waves transmitted and received by the antenna 372 by detecting the current flowing through the antenna 372.

The board 371 is arranged in parallel with the upper surface of the second cover 34, directly below a substantially rectangular opening 34B formed in the left front portion of the upper surface of the second cover 34. The antenna 372 is a loop antenna mounted substantially in the center of the upper surface of the board 371. The antenna 372 has a function of transmitting and receiving radio waves for communicating with an external device.

The third cover 373 closes the opening 34B and is attached to be flush with the upper surface of the second cover 34. The mark 374 indicates the position of the antenna 372, and is printed on the upper surface of the third cover 373 at a position facing the antenna 372. In this embodiment, the mark 374 is located in the center of the third cover 373.

With this configuration, the user brings an external device close to the mark 374 as a guide, and thereby wireless communication is performed between the external device and the image forming apparatus 1. The mark 374 may be configured such that, for example, a part of the third cover 373 is formed of a translucent member, and a light source such as a light emitting diode is arranged directly below the translucent member to illuminate the mark. Further, the size and shape of the mark 374 are not particularly limited.

<Power Button>

As shown in FIGS. 2 and 3, the power button 38 is an operation device for switching the power of the image forming apparatus 1 on and off. The power button 38 is arranged at the right front portion of the second cover 34. The power button 38 may be arranged at a portion of the second cover 34 other than the second discharge tray portion 313, and may be arranged, for example, in the left front portion of the second cover 34.

In the present embodiment, the near-field wireless communication unit 37 is arranged at one end side and the power button 38 is arranged at the other end side in the left-right direction of the second cover 34. With this arrangement, the power button 38 is arranged in the vacant space on the second cover 34 opposite to the near-field wireless communication unit 37.

<Second Recess>

As shown in FIGS. 2 to 4, the second recess 322 is a portion of the sheet handle portion 32 formed at the second cover 34, and is continuously arranged at the front end of the first recess 321. The second recess 322 is located below a sheet supported by the second discharge tray portion 313 and extends to a halfway position of the second discharge tray portion 313 along the sheet discharge direction. The second recess 322 has a shape that is continuous with the first recess 321. The second recess 322, together with the first recess 321, forms the sheet handle portion 32, that is, a recess for handling or picking up a sheet.

The two second recesses 322 have a symmetrical shape in the left-right direction. In the present embodiment, similarly to the first recess 321, the second recess 322 has a flat bottom surface 322A extending in a horizontal direction, an inclined surface 322B extending diagonally upward from the periphery other than the rear end of the bottom surface 322A, and an inclined surface 322C extending diagonally downward from the rear end of the bottom surface 322A (see FIG. 5). The shape of the second recess 322 is not particularly limited, and may be, for example, a substantially rectangular parallelepiped shape.

In the present embodiment, at least part of the second recess 322 overlaps the third cover 373 in the left-right direction when viewed from above. In the present embodiment, as shown in FIG. 2, the front half of the second recess 322 and the rear portion of the third cover 373 overlap each other in the left-right direction when viewed from above. With this arrangement, the length of the second cover 34 in the sheet discharge direction is shortened, and the size of the image forming apparatus 1 is reduced.

In the present embodiment, the length of the second recess 322 in the sheet discharge direction is shorter than the length of the first recess 321 in the sheet discharge direction. Further, the second recess 322 is located farther rearward (that is, farther upstream in the sheet discharge direction) than the antenna 372 and the mark 374.

According to the image forming apparatus 1, by extending the sheet handle portion 32 from the first cover 33 to the second cover 34, the length of the top cover 3 in the front-rear direction is shortened as compared with a case where the sheet handle portion 32 is provided only on the first cover 33. Thus, the size of the image forming apparatus 1 is reduced.

While the disclosure has been described in detail with reference to the above aspects thereof, it would be apparent to those skilled in the art that various changes and modifications may be made therein without departing from the scope of the claims.

What is claimed is:

1. An image forming apparatus comprising:
a housing having an opening; and
a top cover covering the opening, the top cover including:
a first cover including:
a first discharge tray portion configured to support a discharged sheet; and
a first recess formed at the first discharge tray portion, the first recess extending along a sheet discharge direction to a downstream end of the first discharge tray portion in the sheet discharge direction; and
a second cover surrounding the first cover, the second cover including:
a second discharge tray portion arranged downstream of the first discharge tray portion in the sheet discharge direction, the second discharge tray portion being configured to support the discharged sheet in cooperation with the first discharge tray portion; and a second recess arranged downstream of the first recess in the sheet discharge direction, the second recess being formed continuously from the first recess, the second recess serving as a sheet handle portion in cooperation with the first recess.

2. The image forming apparatus according to claim 1, wherein a length of the second recess in the sheet discharge direction is shorter than a length of the first recess in the sheet discharge direction.

3. The image forming apparatus according to claim 1, wherein each of the first recess and the second recess has a flat bottom surface and an inclined surface extending upward from the flat bottom surface.

4. The image forming apparatus according to claim 1, wherein the second cover includes a near-field wireless communication interface configured to perform near-field wireless communication; and wherein the near-field wireless communication interface includes:

an antenna; and a mark indicating a position of the antenna.

5. The image forming apparatus according to claim 4, wherein the second recess is located upstream of the antenna and the mark in the sheet discharge direction.

6. The image forming apparatus according to claim 4, wherein the near-field wireless communication interface includes a third cover covering the antenna; and wherein at least part of the second recess overlaps the third cover in a perpendicular direction perpendicular to the sheet discharge direction as viewed from above.

7. The image forming apparatus according to claim 1, wherein the first cover includes an operation panel; and wherein at least part of the first recess overlaps the operation panel in a perpendicular direction perpendicular to the sheet discharge direction as viewed from above.

8. The image forming apparatus according to claim 1, wherein the top cover includes a sheet stopper configured to contact a downstream end of the discharged sheet in the sheet discharge direction; and wherein the sheet handle portion is arranged at both sides of the sheet stopper in a perpendicular direction perpendicular to the sheet discharge direction as viewed from above.

9. The image forming apparatus according to claim 8, wherein a length of the sheet stopper in the sheet discharge direction is shorter than a length of the first recess in the sheet discharge direction.

10. The image forming apparatus according to claim 4, wherein the second cover includes a power button for switching on and off of a power of the image forming apparatus;

wherein the near-field wireless communication interface is arranged at one end side of the second cover in a perpendicular direction perpendicular to the sheet discharge direction as viewed from above; and wherein the power button is arranged at another end side of the second cover in the perpendicular direction.

11. The image forming apparatus according to claim 1, wherein the first discharge tray portion includes a plurality of ribs extending along the sheet discharge direction to the downstream end of the first discharge tray portion in the sheet discharge direction; and wherein the downstream end of the first discharge tray portion in the sheet discharge direction is located at a higher position than an upstream end of the second discharge tray portion in the sheet discharge direction.

12. The image forming apparatus according to claim 11, wherein the first recess overlaps the plurality of ribs in a perpendicular direction perpendicular to the sheet discharge direction as viewed from above.

13. The image forming apparatus according to claim 11, wherein the first recess is arranged between one of the plurality of ribs and another one of the plurality of ribs in a perpendicular direction perpendicular to the sheet discharge direction as viewed from above.

14. The image forming apparatus according to claim 1, wherein the second recess includes:

a flat bottom surface extending in a horizontal direction;

a first inclined surface extending diagonally upward from a periphery of the flat bottom surface other than an upstream end in the sheet discharge direction; and a second inclined surface extending diagonally downward from the upstream end of the flat bottom surface in the sheet discharge direction.

15. The image forming apparatus according to claim 1, wherein the top cover has a discharging opening for discharging the sheet from the housing to outside; and wherein the first discharge tray portion extends from the discharging opening in the sheet discharge direction.

* * * * *